US010745267B2

(12) United States Patent
Van Ballekom

(10) Patent No.: US 10,745,267 B2
(45) Date of Patent: Aug. 18, 2020

(54) PRODUCT LOSS REDUCTION BY USING SHORTENED PURGE FOR ASEPTIC TANK

(71) Applicant: Tetra Laval Holdings & Finance S.A., Pully (CH)

(72) Inventor: Johannes Van Ballekom, Cobbitty (AU)

(73) Assignee: Tetra Laval Holdings & Finance S.A., Pully (CH)

( * ) Notice: Subject to any disclaimer, the term of this patent is extended or adjusted under 35 U.S.C. 154(b) by 5 days.

(21) Appl. No.: 16/064,187

(22) PCT Filed: Dec. 19, 2016

(86) PCT No.: PCT/EP2016/081757
§ 371 (c)(1),
(2) Date: Jun. 20, 2018

(87) PCT Pub. No.: WO2017/108698
PCT Pub. Date: Jun. 29, 2017

(65) Prior Publication Data
US 2019/0337796 A1     Nov. 7, 2019

(30) Foreign Application Priority Data

Dec. 21, 2015  (SE) ...................................... 1551693

(51) Int. Cl.
*B67D 7/02* (2010.01)
*B67D 7/32* (2010.01)
(Continued)

(52) U.S. Cl.
CPC ............. *B67D 7/3209* (2013.01); *B67D 7/02* (2013.01); *B67D 7/36* (2013.01); *B67D 7/78* (2013.01); *A23C 7/02* (2013.01)

(58) Field of Classification Search
CPC .......... B67D 7/3209; B67D 7/02; B67D 7/36; B67D 7/78; B67D 7/362; B67D 7/365;
(Continued)

(56) References Cited

U.S. PATENT DOCUMENTS 3,044,443 A  *  7/1962  Baum ..................... A01J 5/042
                                                 119/14.06
3,919,975 A  *  11/1975  Duncan .................... A01J 5/01
                                                 119/14.05
(Continued)

FOREIGN PATENT DOCUMENTS

JP     2011-255938 A    12/2011
SE       531164 C2       1/2009

OTHER PUBLICATIONS

Office Action for Swedish Application No. 1551693-3 dated Aug. 18, 2016 in 7 pages.
(Continued)

*Primary Examiner* — Craig J Price
(74) *Attorney, Agent, or Firm* — Knobbe, Martens, Olson & Bear, LLP

(57) ABSTRACT

An intermediate storage tank assembly can include a filling line; a filling machine; and an end-valve assembly. In some embodiments, the intermediate storage tank assembly comprises a switch arranged between said filling machine and said end-valve assembly for detecting a level of product and in response thereto stopping a priming of intermediate storage tank thereby preventing product from reaching said end-valve assembly.

20 Claims, 3 Drawing Sheets

(51) Int. Cl.
*B67D 7/36* (2010.01)
*B67D 7/78* (2010.01)
*A23C 7/02* (2006.01)

(58) Field of Classification Search
CPC .... B67D 7/367; B67D 7/0288; B67D 7/0294; A23C 7/02; Y10T 137/0402; Y10T 137/0419; Y10T 137/0424; Y10T 137/4245; Y10T 137/731; Y10T 137/7313; G09D 9/00; G09D 9/02; G09D 9/04; G09D 9/12; G01F 23/00; A61L 2202/14; B08B 3/08
USPC .......... 222/64–69; 119/14.01–14.55; 73/290 R–290 V; 137/15.01, 15.04, 137/15.05, 238, 241; 426/531
See application file for complete search history.

(56) References Cited

U.S. PATENT DOCUMENTS

| | | | | | |
|---|---|---|---|---|---|
| 4,956,763 | A * | 9/1990 | Stewart, Jr. | ............... | G05D 9/12 137/386 |
| 5,480,063 | A * | 1/1996 | Keyes | ................... | G01F 11/284 137/563 |
| 5,588,458 | A * | 12/1996 | Ushitora | ................. | E03F 1/006 137/205 |
| 5,680,960 | A * | 10/1997 | Keyes | ................... | G01F 11/284 137/563 |
| 5,762,020 | A * | 6/1998 | van der Lely | ........ | A01J 5/0175 119/14.08 |
| 5,769,025 | A * | 6/1998 | van der Lely | ........ | A01J 5/0175 119/14.08 |
| 5,771,917 | A * | 6/1998 | Carney | ................... | F15B 21/06 134/166 C |
| 5,868,280 | A * | 2/1999 | Schroeder | ................ | B67D 1/04 137/192 |
| 5,969,619 | A * | 10/1999 | Niemiro | ................... | G05D 9/00 137/393 |
| 6,079,359 | A * | 6/2000 | van den Berg | ....... | A01J 5/0175 119/14.01 |
| 6,170,703 | B1 * | 1/2001 | Butler | ................... | B67D 1/0045 222/1 |
| 7,104,422 | B2 * | 9/2006 | DiLeo | .................. | B67D 1/1234 222/204 |
| 7,118,011 | B2 * | 10/2006 | Proulx | ................... | B67C 3/204 222/64 |
| 7,161,787 | B2 * | 1/2007 | Joens | ............... | H03K 17/04106 361/140 |
| 7,162,971 | B2 * | 1/2007 | Johannesson | ......... | A01J 5/0134 119/14.01 |
| 7,263,448 | B2 * | 8/2007 | Brown | .................... | G01F 1/007 702/50 |
| 8,381,680 | B2 * | 2/2013 | Westman | ................ | A01J 7/022 119/14.18 |
| 8,863,986 | B2 * | 10/2014 | Randall, Jr. | .......... | B67D 1/0011 137/558 |
| 9,541,442 | B2 * | 1/2017 | Feltgen | ................ | G01F 23/266 |
| 2002/0186140 | A1 * | 12/2002 | Anderson | ................ | G01F 1/52 340/606 |
| 2004/0065677 | A1 * | 4/2004 | Choi | ................ | H01L 21/67017 222/53 |
| 2005/0109795 | A1 * | 5/2005 | Furey | ................... | B67D 1/0012 222/63 |
| 2005/0284882 | A1 * | 12/2005 | Belongia | .................. | B67D 7/08 222/64 |
| 2010/0111760 | A1 * | 5/2010 | Ringstrom | ............... | A23C 7/02 422/38 |
| 2011/0041770 | A1 * | 2/2011 | Westman | ................ | A01J 7/022 119/14.15 |
| 2011/0318463 | A1 * | 12/2011 | MacGregor | ........... | A23C 3/033 426/522 |
| 2013/0276530 | A1 * | 10/2013 | Kanasaki | ................ | G01F 23/14 73/290 R |
| 2014/0196537 | A1 * | 7/2014 | Park | ....................... | G01F 23/16 73/299 |
| 2014/0283928 | A1 * | 9/2014 | Tamate | ................ | G05D 7/0635 137/389 |
| 2017/0042112 | A1 * | 2/2017 | Bosma | ................... | A01J 7/022 |

OTHER PUBLICATIONS

Search Report and Written Opinion for International Application No. PCT/EP2016/081757 dated Feb. 2, 2018, in 16 pages.
"Thermotechnical On-off Control System", Rao Jihang, Water Resources and Electric Power Press, pp. 24-25, Published Date Oct. 31, 1985.

* cited by examiner

PRODUCT LOSS REDUCTION BY USING SHORTENED PURGE FOR ASEPTIC TANK

TECHNICAL FIELD

The present invention pertains to an apparatus and a method for improved intermediate storage, and in particular to an apparatus and a method for improved aseptic intermediate storage and filling.

BACKGROUND ART

In many different food processing lines the use of an intermediate storage before a filling machine is employed. One example of such food processing line is UHT (Ultra High Temperature) processing of dairy products.

An aseptic tank is thus used for intermediate storage of UHT treated dairy products. Product flow and service media connections are placed in its valve and control module. An aseptic tank can be used in many ways in UHT lines, depending on plant design and the capacities of the various units in the process and packaging lines. Two examples are:

If one of the packaging machines unexpectedly stops, the aseptic tank takes care of the surplus product during the stoppage; or simultaneous packaging of two products. The aseptic tank is first filled with one product, sufficient to last for a full shift of packaging. Then the UHT plant is switched over to another product, which is packed directly in the line of packaging machines.

One or more aseptic tanks included in the production line thus offer flexibility in production planning. Direct packaging from a UHT plant requires recirculation of a minimum extra volume of 300 litres per hour to maintain a constant pressure to the filling machines. Products that are sensitive to reprocessing cannot tolerate this and the required overcapacity must then be fed from an aseptic tank. One of the major advantages of an aseptic tank is that the product is only processed once, and in optimal conditions. This will always secure consistent, and best, product quality.

The optimum arrangement of UHT plants, aseptic tanks and aseptic packaging machines must thus be decided for each individual process.

One example of a contemporary aseptic intermediate storage tank is the Tetra® Alsafe® tank series.

Aseptic packaging has been defined as a procedure consisting of sterilisation of the packaging material or container, filling with a commercially sterile product in an aseptic environment, and producing containers that are tight enough to prevent recontamination, i.e. that are hermetically sealed.

For products with a long non-refrigerated shelf life, the package must also give almost complete protection against light and atmospheric oxygen. A milk carton for long-life milk must therefore be of high-quality carton board sandwiched between layers of polyethylene plastic. The term "aseptic" implies the absence or exclusion of any unwanted organisms from the product, package or other specific areas. "Hermetic" is a term used to indicate suitable mechanical properties to exclude the entry of bacteria into the package or, more strictly, to prevent the passage of micro-organisms and gas or vapour into or from the container.

It is as such of importance that the product is kept aseptic all the way to the filling machine.

Contemporary process lines employ a cluster of valves for regulating the flow from the intermediate storage and the filling machines to the filling pipes. Such end-valve clusters are generally recommended to be placed at least 7 m away from the filling machine and they are therefore sometimes placed by the intermediate storage tank to avoid any steam or fluids escaping the valves and contaminating the sterile filling area. The distance from the end-valve cluster to the actual filling line may thus be quite large. A nominal distance is 30 meters.

At the start of production, before the filling machine connected to the intermediate storage tank can start producing, it is necessary to purge the air from the storage tank to the filling machine, and therefore prime the line with product to the filling machine. When an intermediate storage tank is to be primed (i.e. to pour or admit product fluid into the tank to expel air and prepare for action) the filling line is primed all the way to the end-valve cluster or assembly. This is done after a tank has been cleaned, such as by Clean-In-Place (CIP) systems and Sterilised-In-Place, (SIP).

This results in that a large quantity of product, namely the quantity residing in the pipe leading from the end-valve cluster to the last filling machine—is filled unnecessarily. If it is not used later and goes to waste.

As cleaning is often made hundreds of times a year the loss is not negligible. For example, a nominal length of 30 meters from filling machine to end-valve cluster the piping holds approximately 55 litres of product. At a price of 1$ per litre of product and a cleaning of 250 times per year, a loss of $13,750 is caused every year by the cleaning alone.

One alternative solution of cleaning less would introduce a higher risk of a contaminated product and also a lower quality product as fouling of the piping would also affect for example the heat transfer coefficient which affects the hold time.

The alternative solution of recovering the product in the static leg after production and using the recovered product in future production also has a high risk of product contamination The alternative solution of installing the end of line cluster close to the last filling machine has the risk of product contamination, and product, steam and CIP discharges interfering with the operation of the filling machine Accordingly, an improved apparatus for intermediate storage would be advantageous for which such product waste is avoided.

SUMMARY OF THE INVENTION

It is an object of the present invention to mitigate, alleviate or eliminate one or more of the above-identified deficiencies in the art and disadvantages singly or in any combination and solve at least the above mentioned problem.

According to a first aspect, these and other objects are achieved in full, or at least in part, by a method for priming an intermediate storage tank assembly, said method comprising: priming an intermediate storage tank; detect a product level in a filling pipe between a filling machine and an end-valve assembly and then stop the priming.

In one embodiment, the method further comprises preventing product from reaching said end-valve assembly.

In one embodiment, a level switch detects the product level.

In one embodiment, the method further comprises closing a prime valve arranged downstream of said switch after the switch has been closing which prime valve prevents air from migrating back upstream of the filling line.

Another aspect is to provide an intermediate storage tank assembly comprising a filling line; a filling machine; and an end-valve assembly, wherein said intermediate storage tank assembly is characterized in that it comprises a switch being arranged between said filling machine and said end-valve assembly for detecting a level of product and in response thereto stop a priming of said intermediates storage tank thereby preventing product from reaching said end-valve assembly.

In one embodiment, the intermediate storage tank assembly further comprises a prime valve arranged downstream of said switch and arranged to be closed to prevent air from migrating upstream.

Another aspect is to provide a switch to be installed between a filling machine and an end-valve assembly of an intermediate storage tank assembly comprising a intermediate storage tank, said switch being arranged for detecting a level of product during priming of said intermediate storage tank and in response thereto stop a priming of said intermediate storage tank thereby preventing product from reaching said end-valve assembly. Another aspect is to provide a prime valve to be installed between a switch and an end-valve assembly of an intermediate storage tank assembly, said prime valve being arranged for preventing air from migrating upstream during priming of said intermediate storage tank assembly.

Another aspect is to provide a method for installing a switch in an intermediate storage tank assembly comprising an intermediate storage tank and an end-valve assembly, said switch being arranged for detecting a level of product during priming of said intermediate storage tank and in response thereto stop a priming of said intermediate storage tank thereby preventing product from reaching said end-valve assembly, said method comprising installing said switch between a filling machine and said end-valve assembly.

An apparatus and method as disclosed herein may beneficially be used in food processing, and preferably in UHT treatment of dairy products.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise.

BRIEF DESCRIPTION OF THE DRAWINGS

The above objects, as well as additional objects, features and advantages of the present invention, will be more fully appreciated by reference to the following illustrative and non-limiting detailed description of preferred embodiments of the present invention, when taken in conjunction with the accompanying drawings, wherein.

DETAILED DESCRIPTION OF PREFERRED EMBODIMENTS OF THE INVENTION

Figure 1:
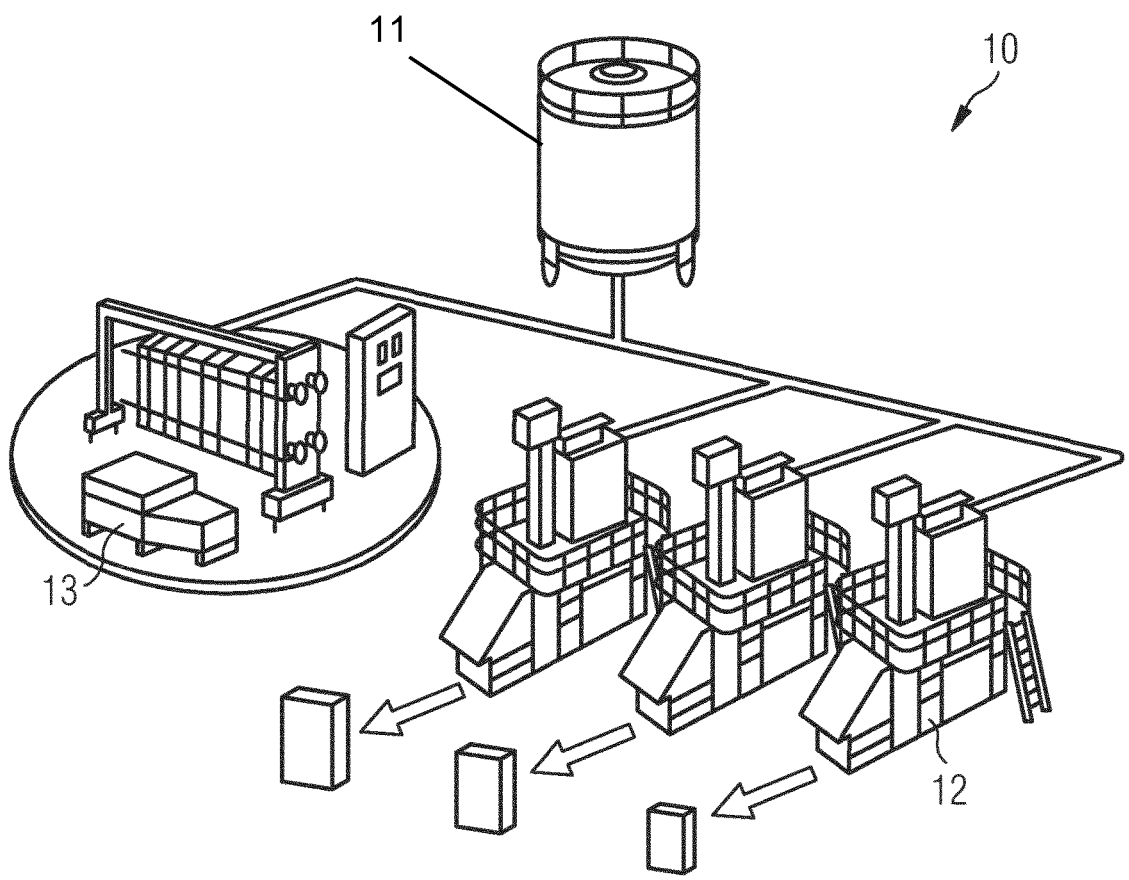
FIG. 1 shows a general schematic view of an intermediate storage tank assembly.

FIG. 1 shows a general schematic view of an intermediate storage tank assembly 10 and how an intermediate storage tank 11 is connected to a filling machine 12. The intermediate storage tank 11 is also connected to a process line, such as a UHT process line 13.

In the example of FIG. 1, the storage tank 11 acts as a buffer for at least one filling machine 12 (three are shown in FIG. 1), however, it should be noted that the teachings herein may also be applied to using the intermediate storage tank for filling a second product as has been disclosed in the background section.

Figure 2:
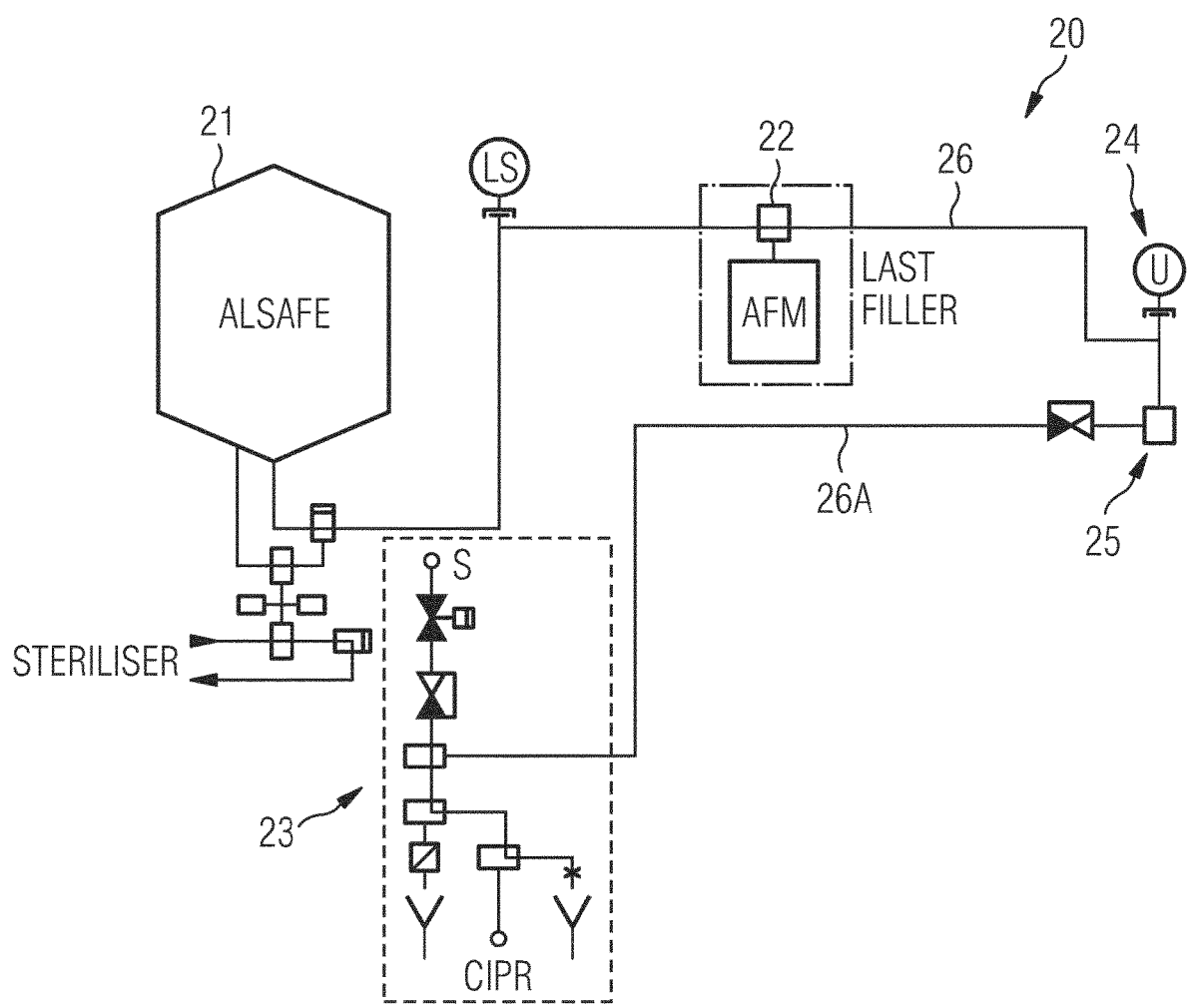
FIG. 2 shows a schematic view of an intermediate storage tank assembly according to an embodiment of the teachings herein.

FIG. 2 shows a schematic view of an intermediate storage tank assembly according to an embodiment of the teachings herein. An intermediate storage tank assembly 20 comprises an intermediate storage tank 21 which is to be connected to a filling machine 22.

An end-valve assembly 23 is connected to the last filling machine for filling of the product.

When the filling line 26 (including the filling machine 22 and the intermediate storage 21) has been cleaned (or after installation). The product is pumped into the intermediate storage tank 21 and through the filling line to the filling machine, pipes 26 and 26a to end of line cluster 23. The piping 26 thus has to be primed from the filling machine 22 or the intermediate storage 21 all the way to the end-valve assembly 23.

To reduce the amount of product in the static portion 26A of the pipe leading to the end-valve assembly 23 from the filling machine, the inventors have realised after insightful reasoning and inventive thought that by introducing a level switch 24, between the intermediate storage tank 21 (and the filling machine 22) and the end-valve assembly 23, the filling pipe 26 may be shut off and the pipe need only be primed to the level switch 24. Placing the level switch adjacent to or close to the intermediate storage tank 21 (or the filling machine) reduces the length of static pipe 26A by at least the nominal distance (of 30 meters), thereby reducing the annual loss by tens of thousands of dollars per filling line.

The new level switch 24 is installed downstream of the last filling machine and is arranged to stop the prime after a preset time. The preset time depends on the overall design of the production line. The level switch 24 is a switch arranged to close the filling line 26 as a level of product is reached. The switch is therefore activated by the rising level of product which indicates that the intermediate storage tank 21 has been filled or primed.

By introducing the level switch 24, the filling line may be arranged so that mainly air passes through to the end-valve assembly 23. The product is thus retained upstream of the new level switch 24 and reduces the product waste.

In one embodiment a prime valve 25 is arranged about 1 meter downstream of the level switch 24 to prevent (sterile) air from migrating back to the filling machine.

The prime valve is kept open during pre-sterilization and cleaning (such as through CIP systems).

In one embodiment the prime valve is an aseptic valve.

In one embodiment the prime valve is a check valve.

By preventing the product from reaching the end-valve assembly 23, the risk of burn on at the manifold is decreased as the product is also prevented from being in contact with the hot valve surfaces which are caused by steam barriers in the end-valve assembly. Therefore as a secondary benefit, as product no longer rests at the end of line cluster, a low fouling end-valve cluster assembly is no longer needed.

During the prime, we need to control the rate at which product displaces air. For this reason, the valve 25 may be a throttle valve that can partially open during the prime, yet fully open during CIP and SIP. Alternatively the valve may be a plug valve with a hole drilled in the plug, open for CIP and SIP. The check valve downstream of valve 26 preventing the passage of air back to the filling machine.

Figure 3:
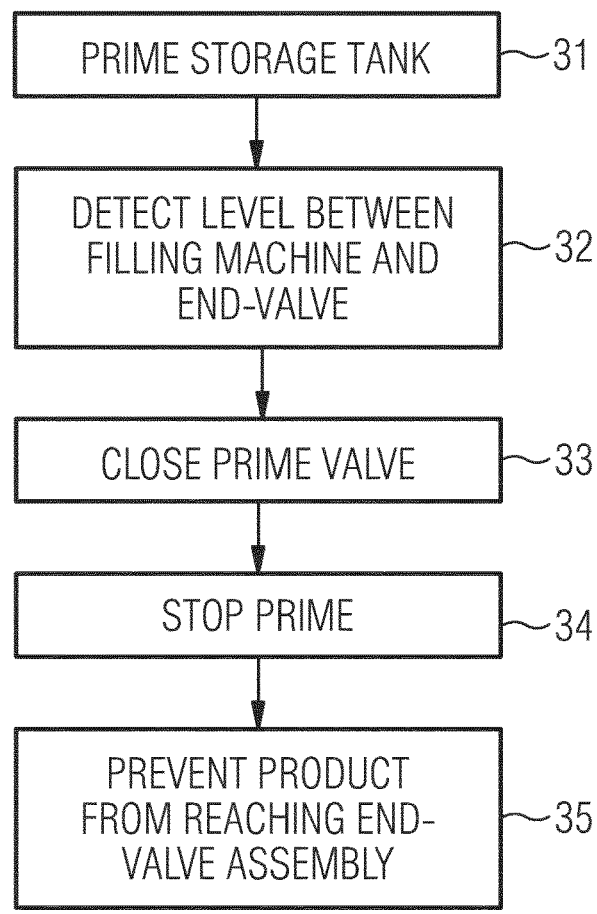
FIG. 3 shows a flowchart of a general method according to the teachings herein.

FIG. 3 shows a flowchart of a general method according to the teachings herein for reducing the product waste when priming an intermediate storage tank.

An intermediate storage tank 21 is primed 31, and a level switch arranged between the filling machine 22 and an end-valve assembly 23 detects a level of product 32 in a filling pipe and the priming is stopped 34, possibly after a preset time, and the product is prevented 35 from reaching the end-valve assembly 23. In one embodiment a prime valve is closed 33 after or at the same time as the level switch 24 activates.

The switch 24 may be added to an existing intermediate storage tank assembly 20 as part of a service or an upgrade, or it may be part of the intermediate storage tank assembly upon installation.

Figure 4:
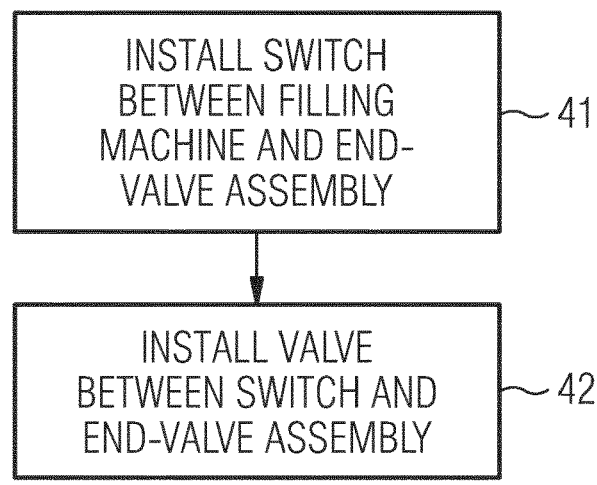
FIG. 4 shows a flowchart of a general method for upgrading an intermediate storage tank assembly according to the teachings herein.

FIG. 4 shows a flowchart for such an upgrade, where a switch is installed 41 between a filling machine 22 and an end-valve assembly 23. Alternatively a prime valve 25 is also installed to prevent air from migrating upwards.

It is understood that other variations in the present invention are contemplated and in some instances, some features of the invention can be employed without a corresponding use of other features. Accordingly, it is appropriate that the appended claims be construed broadly in a manner consistent with the scope of the invention.

Further, the invention has mainly been described with reference to a few embodiments. However, as is readily understood by a person skilled in the art, other embodiments than the ones disclosed above are equally possible within the scope of the invention.

The invention claimed is:

1. A method for priming an intermediate storage tank assembly, said intermediate storage tank assembly including an intermediate storage tank, a filling machine, an end-valve assembly, and a filling line connected to the intermediate storage tank, the filling machine, and the end-valve assembly, said method comprising:
    priming the intermediate storage tank with a product;
    allowing the product to flow from the intermediate storage tank through at least a portion of the filling line and through the filling machine; and
    detecting a product level in the filling line between the filling machine and the end-valve assembly and then stopping the priming.

2. The method according to claim 1, further comprising preventing the product from reaching said end-valve assembly.

3. The method according to claim 1, wherein the detecting of the product level in the filling line is performed by a level switch.

4. The method according to claim 3, further comprising closing a prime valve arranged downstream of said level switch, wherein the prime valve is configured to prevent air from migrating back upstream along the filling line towards the filling machine.

5. The method according to claim 4, wherein the prime valve is arranged 1 meter (3.28 feet) downstream of the level switch.

6. The method according to claim 4, wherein the closing of the prime valve is performed at the same time as the stopping of the priming.

7. The method according to claim 4, wherein the closing of the prime valve is performed after the stopping of the priming.

8. The method according to claim 1, wherein the stopping of the priming is performed after a preset time.

9. An intermediate storage tank assembly comprising:
    a filling line;
    a filling machine;
    an end-valve assembly connected to the filling machine via the filling line; and
    a switch arranged between said filling machine and said end-valve assembly and configured to detect a level of a product in the filling line, and, in response thereto, stop a priming of an intermediate storage tank thereby preventing the product from reaching said end-valve assembly.

10. The intermediate storage tank assembly according to claim 9, further comprising a prime valve arranged downstream of said switch, wherein the prime valve is configured to prevent air from migrating upstream along the filling line towards the filling machine.

11. The intermediate storage tank assembly according to claim 10, wherein the prime valve is a check valve.

12. The intermediate storage tank assembly according to claim 10, wherein the prime valve is an aseptic valve.

13. The intermediate storage tank assembly according to claim 10, wherein the prime valve is arranged 1 meter (3.28 feet) downstream of the switch.

14. The intermediate storage tank assembly according to claim 9, wherein the switch is configured to stop the priming of the intermediate storage tank after a preset time.

15. A method for installing a switch in an intermediate storage tank assembly, wherein the intermediate storage tank assembly comprises:
    an intermediate storage tank, a filling machine, an end-valve assembly, and a filling line connected to the intermediate storage tank, the filling machine, and the end-valve assembly, wherein said switch is configured to detect a level of a product in the filling line during priming of the intermediate storage tank, and, in response thereto, stop the priming of said intermediate storage tank thereby preventing the product from reaching said end-valve assembly;
    said method comprising installing said switch between the filling machine and said end-valve assembly.

16. The method according to claim 15, wherein the switch is configured to stop the priming of the intermediate storage tank after a preset time.

17. The method according to claim 15, wherein said intermediate storage tank assembly further comprises a prime valve arranged downstream of said switch, and wherein the prime valve is configured to prevent air from migrating upstream along the filling line towards the filling machine.

18. The method according to claim 17, wherein the prime valve is arranged 1 meter (3.28 feet) downstream of the switch.

19. The method according to claim 17, wherein the prime valve is a check valve.

20. The method according to claim 17, wherein the prime valve is an aseptic valve.

* * * * *